United States Patent [19]
Fish et al.

[11] 3,990,032
[45] Nov. 2, 1976

[54] VEHICLE WEIGHING SYSTEM

[75] Inventors: David H. Fish, Fairmont, Minn.;
Charles H. Knodel, Germantown,
Tenn.; Harry J. Keen, Waterford;
Paul Barrett, Concord, both of Vt.

[73] Assignee: **Colt Industries Operating
Corporation,** New York, N.Y.

[22] Filed: Dec. 8, 1975

[21] Appl. No.: 638,447

[52] U.S. Cl............................. 338/5; 73/88.5 SD;
177/136; 177/211
[51] Int. Cl.².......................................... G01L 1/22
[58] Field of Search .................... 338/2, 5, 47, 50;
73/141 A, 88.5 SD; 177/136, 211

[56] References Cited
UNITED STATES PATENTS

| | | | |
|---|---|---|---|
| 3,194,058 | 7/1965 | Kurkjian | 177/136 X |
| 3,273,382 | 9/1966 | Fonash | 177/136 X |
| 3,602,866 | 8/1971 | Saxl | 338/5 |
| 3,650,340 | 3/1972 | Bradley | 177/211 X |
| 3,669,756 | 6/1972 | Bradley | 177/136 |

*Primary Examiner*—C. L. Albritton
*Attorney, Agent, or Firm*—Gardiner, Sixbey, Bradford & Carlson

[57] ABSTRACT

The vehicle weighing system for a towed vehicle includes removable stub axles and a hitch rigidly connected to a load support. The hitch and one or more of the stub axles are gauged in an identical manner. Two active electrical strain gauges are placed in a hole formed in the supporting member to be gauged, such hole extending normal to the direction of the load. The hole is placed adjacent the end of the supporting member which is remote from the load support and the two gauges are oriented to reduce the moment sensitivity of the system to a minimum. The hitch is provided with additional compensating gauges which are not responsive to strain, and the axle and hitch gauges are connected to form a measuring bridge circuit. The gauging holes are sealed by end plugs, a printed circuit board, potting compound and a boot, all of which are flexible so as not to interfere with the weight measurement.

22 Claims, 7 Drawing Figures

VEHICLE WEIGHING SYSTEM

BACKGROUND OF THE INVENTION

There is an ever increasing demand for low cost, accurate weighing systems for use on load bearing vehicles such as portable grain feed mixers and mills employed by the farming industry. Weighing systems for such vehicles must be extremely rugged and capable of operating effectively after being exposed to the shock and abuse presented by the environment in which farm vehicles operate. Such vehicles are normally operated over rough terrain and are exposed to the elements including extremes of temperature and humidity.

Although electronic weighing systems employing gauge technology have long been known to the art and are readily available, such devices are not readily adapted for use in a rough vehicular environment. On board electronic weighing systems have found widespread use on vehicles normally operated over roads or other flat surfaces, but these vehicular weighing systems are not subjected to the variations caused by uneven terrain, where operation on inclines and over rocks and crevices induces numerous measurement errors.

Recently, attempts have been made with some success to develop simple, economical, and accurate electro-mechanical weighing systems for rugged vehicular use. Examplary of such systems are the strain gauge weighing device and the vehicle coupling weighing device disclosed by U.S. Pat. Nos. 3,650,340 and 3,669,756 to Richard S. Bradley.

The Bradley weighing system for vehicles provides a measurement which is substantially independent of the mounting surface upon which the vehicle rests. The two pairs of electrical resistance strain gauges are affixed to each vehicle load member with each pair having one strain gauge mounted above and the second strain gauge mounted below the load bearing member in juxtaposition. The strain gauges of each pair are affixed to the load member, and the first pair of strain gauges is spaced a prescribed distance from the second pair. The strain gauges provide inputs to microminiature integrated circuitry which is housed in a remotely located housing.

The load members employed in the Bradley system constitute replaceable vehicle axles, and no modification of the vehicle is required other than the substitution of a replaceable axle and axle mounting plate. This replaceable axle is a stub axle which is rigidly connected to the load receiving container.

Although the weight measuring system of the Bradley patents provides definite advantages over prior systems for rugged vehicular use, this system is still subject to certain deficiencies when employed on load carrying vehicles. For example, the Bradley strain gauge weighing device requires the use of at least four strain gauges disposed in horizontal spaced relationship with one strain gauge of each pair being affixed to the upper surface of an axle while the remaining strain gauge of each pair is affixed to the lower surface of an axle. The upper and lower strain gauges must be mounted in juxtaposition, and the pairs of strain gauges must be spaced one from another on the axle surface. This surface mounting of the strain gauges in relatively widely spaced relationship on the axle of a load bearing vehicle adapted for rugged use makes it very difficult to protect the gauge units from damage. It is necessary to provide a protective covering sufficient to include both spaced pairs of strain gauges, but since the gauges are externally mounted on the axle, even a protective covering is insufficient to shield the gauges from shocks imposed by rocks and other objects which strike the axle.

For the spaced strain gauge pairs illustrated in the Bradley patent to operate effectively to measure differential bending these gauges must be mounted very near the upper and lower surfaces of the supporting axle, and threfore even if the gauges are slightly embedded in the axle surface, they are still very difficult to protect. In actuality, such embedded gauges are still the full equivalent of surface mounted gauges and are responsive to external temperatures and humidity adjacent the surface of the axle. Also, embedded gauges are still subjected to severe shock received by the axle surface, and are much more likely to be damaged by water and other elements which might be admitted by a defective or worn out protective covering.

Ideally, the axle mounted strain gauges should be placed centrally within the axle, but this often results in severe weakening of the axle structure. Exemplary of such weakened structures is the force transducer shown by U.S. Pat. No. 3,602,866 to Erwin J. Saxl. Here a lead carrying beam is formed with a reduced waist section, and a hole for receiving strain gauges is then formed in this reduced waist section.

It is a primary object of the present invention to provide a novel and improved vehicle weighing device wherein sensing gauges are applied to separate stub axles and a hitch unit for the vehicle. However, these gauges are mounted internally within the stub axle or hitch to which they are affixed, and are therefore as far removed as possible from the outer surfaces thereof. This enables the gauges to be completely protected from the elements and from shocks to which the gauge bearing member is subjected.

Another object of the present invention is to provide a novel and improved vehicle weighing system which operates effectively with the minimum number of active weight sensing units. On any stub axle or vehicle coupling arm bearing a sensing gauge assembly, only one pair of active gauges is required. The individual gauges in this active pair of gauges are mounted in closely spaced relationship, and therefore are much easier to protect from shock and the effects of the elements than widely spaced gauge pairs presently employed in known vehicle weighing systems. Also, the use of only two active gauges greatly reduces the cost of the gauging system.

A further object of the present invention is to provide a novel and improved vehicle weighing system wherein measuring gauges are mounted on separate axle units and a hitch for the vehicle. The gauges affixed to each axle unit and hitch are mounted within a hole oriented perpendicular to the direction of load to retain maximum fiber strength for the mounting unit. The gauges are angularly oriented to measure strain, thereby producing a high output without requiring a reduction in the cross section of the gauge bearing member adjacent the gauges. Temperature tracking may be effectively provided by two gauges located on the neutral axis of a load bearing member and oriented cross-wise to the direction of loading so that they will be subjected to no strain.

A still further object of the present invention is to provide a novel and improved vehicle weighing system wherein both sensing gauges and the bridge circuitry for such gauges is mounted in close relationship directly on a load bearing member.

These and other objects of the present invention will become readily apparent from a consideration of the following specification and claims taken in conjunction with the accompanying drawings in which:

Figure 1:
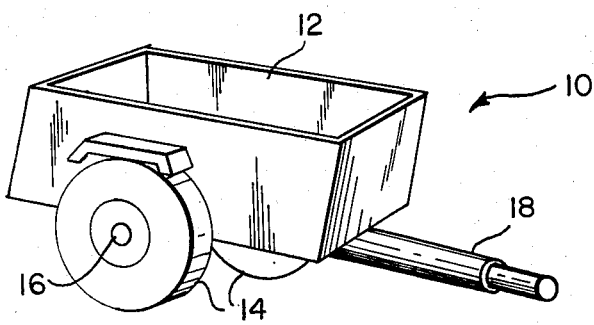
FIG. 1 is a perspective view of a load bearing vehicle which is equipped with the weighing system of the present invention.

Referring now to the drawings, it will be noted in FIG. 1 that a load bearing vehicle 10 which may be provided with the vehicle weighing system of the present invention includes a load container 12 which is supported by a plurality of ground engaging supports, in this case wheels, 14. Each of the wheels 14 is connected to the load container 12 by a removable stub axle 16, with a separate axle being provided for each of the wheels. The vehicle 10 is propelled by a towing vehicle by means of a hitch 18 which is also secured to the load container 12.

Figure 2:
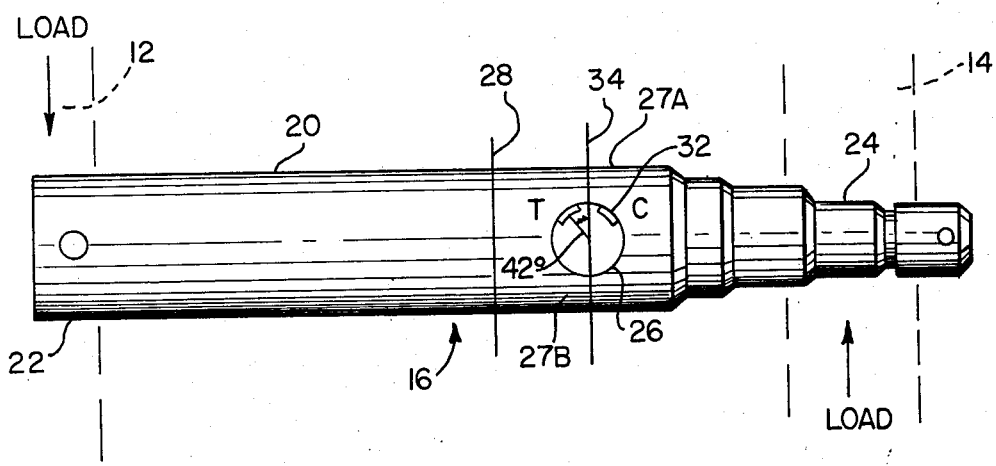
FIG. 2 is a view in side elevation of a stub axle for the vehicle of FIG. 1.

Referring now to FIG. 2, each stub axle 16 includes an elongated body 20 of substantially circular cross-section having an end 22 which is adapted to be secured to the load container 12. When the stub axle is in place on the vehicle 10, the end 22 thereof will be rigidly secured to the load container either directly or by means of a rigid mounting assembly of known type. The end of the stub axle body 20 opposite the mounting end 22 is reduced in cross section and shaped in known manner to form a mounting spindle for the hub of the ground engaging wheels 14.

For measuring the load applied to the stub axle 16, a hole 26 is formed to extend through the body 20. This hole extends in a direction which is normal to the central longitudinal axis of the stub axle and also normal to the direction of the load on the ends of the stub axle. The center of the hole 26 is bisected by the central longitudinal axis of the stub axle, and ideally, the hole is positioned as close to the end 24 of the stub axle as possible, but not in the area of reduced cross-section. This hole positioning is quite important, as the load which must be sustained by the thin bridge sections of the axle 27A and 27B above and below the hole increases as the hole is positioned farther from the wheel 14 and axle end 24. Therefore, it is desirable in all instances, to position the hole 26 on the half section of the axle between the center line 28 and the wheel mounting end 24.

Since the stub axle 16 constitutes an important load bearing element for the vehicle 10, it is important to form the hole 26 in such a manner that the strength of the stub axle is not seriously lessened. Strength factors will determine the proximity of the hole 26 to the wheel mounting end 24 of the axle, and it has been found that the orientation of the hole perpendicular to both the direction of load and the longitudinal axis of the stub axle permits the axle to retain maximum fiber strength. The section of the axle containing the hole is not reduced in cross-section relative to the remainder of the axle, and the diameter of the hole 26 should not exceed the radius of the portion of the body 20 through which the hole extends.

Preferably, the hole 20 is gauged by two strain gauges 30 and 32 bonded to the surfaces thereof above the central longitudinal axis of the axle. These gauges are equally spaced from a vertical center line 34 which is perpendicular to the longitudinally extending central axis of the axle 16 and which extends through the center of the circular hole 26. A line drawn from the center of each of the gauges 30 and 32 to the center of the hole 36 should form an angle within the range of from 37 to 47° with the vertical center line. To minimize the moment sensitivity of the gauging system for various positions of the hole 26 along the axle, this angle is ideally 42° as illustrated in FIG. 2.

The angular relationship of the gauges 30 and 32 relative to the vertical center line through the hole 26 is extremely important, for as the angular relationship deviates on either side of 42°, the gauging system becomes increasingly moment sensitive. With the two gauges placed on an angle of 42° to the vertical center line as shown in FIG. 2, moment sensitivity of the gauges is minimized and a maximum gauge output is obtained. Thus, in the arrangement shown, the gauge 30 will be in tension while the gauge 32 is in compression.

Figure 3:
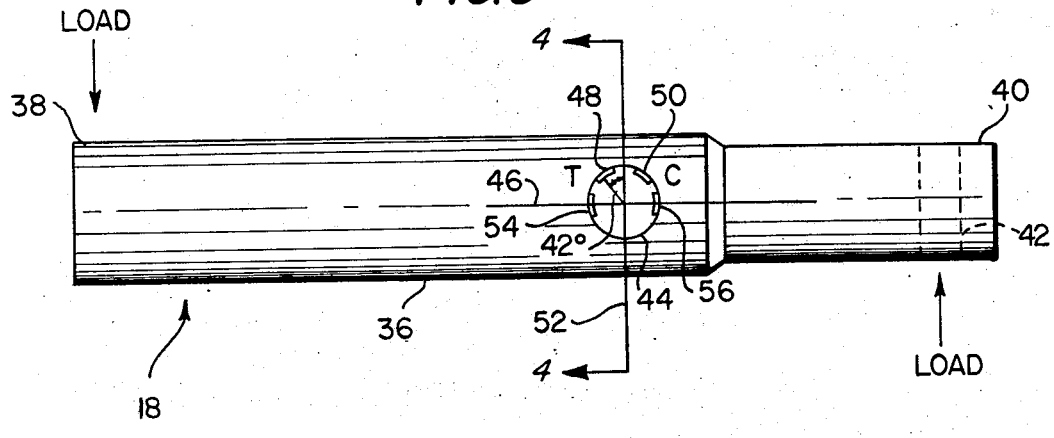
FIG. 3 is a view in side elevation of a hitch for the vehicle of FIG. 1.

Turning now to FIG. 3, the hitch 18 of FIG. 1 is illustrated and includes a body section 36 of substantially circular cross-section having an end 38 which is rigidly connected to the vehicle 10. This connection may be accomplished by welding directly to the load container 12, or by other means suitable to accomplish a rigid connection.

The end 40 of the body 36 opposite the end 38 is of reduced cross-section and is adapted for connection to a towing vehicle. For example, a hole 42 may be provided to extend vertically through the end 40 to receive a connecting pin from the towing vehicle.

The hitch 18 is provided with weight sensing gauges in a manner substantially identical to that previously described in connection with the axle 16 of FIG. 2. Thus, the hitch is provided with a hole 44 which passes through the hitch body in a direction substantially perpendicular to the normal direction of load applied to the hitch. The central longitudinal axis 46 of the hitch passes through the center of the hole 44, and this hole is positioned in the body 36 as close as possible to the end 40. As in the case of the hole 26 of the axle 16, the hole 44 is positioned in the thicker portion of the body 36, but in order to impart maximum strength to the hitch, the hole should be positioned in the half section thereof adjacent the end 40.

The hole 44 is provided with two strain gauges 48 and 50 which operate to gauge the hitch in a manner identical to that previously described in connection with the axle 16. These gauges are both positioned at an angle of between 37° and 47° with relation to a vertical center line 52 extending perpendicularly to the line 46 through the center of the hole 44. Ideally, a line drawn from the center of the hole 44 to the center of each of the gauges 48 and 50 defines an angle of 42 degrees with respect to the vertical center line 52.

In addition to the gauges 48 and 50, a second pair of gauges 54 and 56 may also be secured to the body 36 within the hole 44. The gauges 54 and 56 constitute inactive gauges located on the neutral axis of the hitch, and each gauge is oriented cross-wise to the direction of loading so that it will see no strain when a load is applied to the hitch. Thus, as will be readily apparent from a consideration of FIG. 4 taken in conjunction with FIG. 3, the central longitudinal axis 46 of the hole 18 not only passes through the center of the hole 44, but also passes through the center of each of the gauges 54 and 56. Also, a plane passing through the central longitudinal axis of the hole 44, as indicated by the line 58 in FIG. 4, also passes through the center of the gauges 54 and 56. Finally, a vertical plane which is perpendicular to the plane 58 and oriented along the central axis 46 of the hitch 18 as indicated by line 60 in FIG. 4, passes, through the center of the gauges 54 and 56 and also through the center of the gauges 48 and 50. However, as is clearly indicated by FIG. 4, the gauges 48 and 50 are oriented to sense the loading on the hitch 18, while the gauges 54 and 56 along the neutral axis of the hitch are oriented crosswise to the direction of loading and will therefore register no strain. However, the inactive gauges 54 and 56 provide thermal tracking for the active gauges in the hitch 18 in a manner to be subsequently disclosed.

Figure 4:
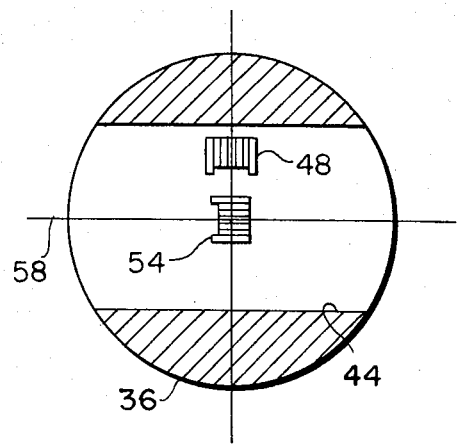
FIG. 4 is a sectional view taken along line 4—4 of FIG. 3.
Figure 5:
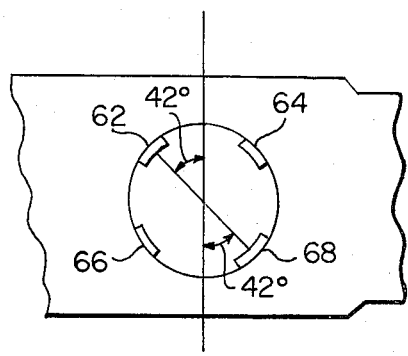
FIG. 5 is a view in side elevation of a section of a second embodiment of a weight sensing mechanism of this invention.

FIG. 4, which illustrates the orientation of the gauges 48 and 50 for the hitch 18, also illustrates the orientation of the gauges 30 and 32 within the stub axle 16. It will be noted that all of these active gauges are centered within the respective holes 26 and 44 and are oriented to sense strain. Also, although the gauges for the axle and the hitch have been shown attached to the upper surfaces of the gauging hole, the gauges could also be secured in the same relative angular relationship to the bottom surfaces of each gauging hole. In fact, as illustrated by FIG. 5, it is possible to employ two pairs of gauges in each gauging hole for both the stub axle 16 and the hitch 18. In this configuration, both the upper and lower surfaces of the gauging hole would be provided with electrical resistance strain gauges as illustrated by gauges 62, 64, 66 and 68.

It has been found that by using two active gauges in both the stub axle 16 and the hitch 18, the cost of gauge installation plus the cost of gauges is minimized over that incurred when two pairs of active gauges are used. Additionally, it has been found that two gauges have a higher probability of performing and continuing to perform properly than do four gauges.

Figure 6:
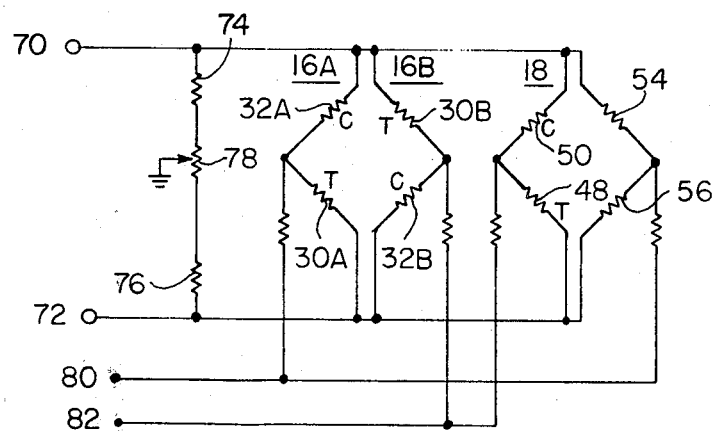
FIG. 6 is a circuit diagram of an electrical strain gauge bridge assembly employed with the present invention.

Referring now to FIG. 6, the active electrical resistance strain gauges in the stub axle 16 and the active and inactive strain gauges in the hitch 18 are connected together as illustrated to form a measuring bridge circuit. This bridge circuit includes input terminals 70 and 72 which are connected to a suitable power supply for the strain gauge bridges. Connected across the power input to the bridge circuit are resistors 74 and 76 which are in series with a potentiometer 78. The slider of the potentiometer is grounded, and this potentiometer constitutes a zero balance control for the load cell bridge circuit.

For purposes of illustration in FIG. 6, the two stub axles 16 for the vehicle 10 of FIG. 1 are identified as 16A and 16B, and the electrical strain gauges mounted on such axles are designated respectively by the letters A and B. Thus, the electrical resistance strain gauges of the stub axle 16A are connected in a half bridge configuration while the electrical resistance strain gauges 30B and 32B in the stub axle 16B are connected to form a second half bridge circuit. These two half bridge circuits are connected to the power inputs 70 and 72 and to output terminals 80 and 82 so as to operate as a first strain gauge measuring bridge. It will be noted that the upper arms of this bridge include compression strain gauge 32A and tension strain gauge 30B while the lower arms of the bridge contain tension strain gauge 30A and compression strain gauge 32B.

A second strain gauge bridge is formed by the active and inactive gauges in the hitch 18, and this second bridge is connected in parallel across the power terminals 70 and 72 with the bridge formed by the axle strain gauges. The hitch bridge includes two half bridge circuits, one of which is formed by the active hitch strain gauge 48 and 50 while the second bridge half is formed by the inactive hitch strain gauges 54 and 56. The tension and compression gauges are identified respectively by the letters T and C in FIG. 6.

The outputs of the electrical strain gauge bridges formed by the strain gauges from the axles 16A and 16B and the active and inactive strain gauges from the hitch 18 are connected across equal value output resistors in known manner to the output terminals 80 and 82. These output terminals then may be connected to any suitable measuring instrument, such as the measuring instrument disclosed in U.S. Ser. No. 543,465 filed on Jan. 23, 1975, and assigned to the assignee of the present application.

Figure 7:
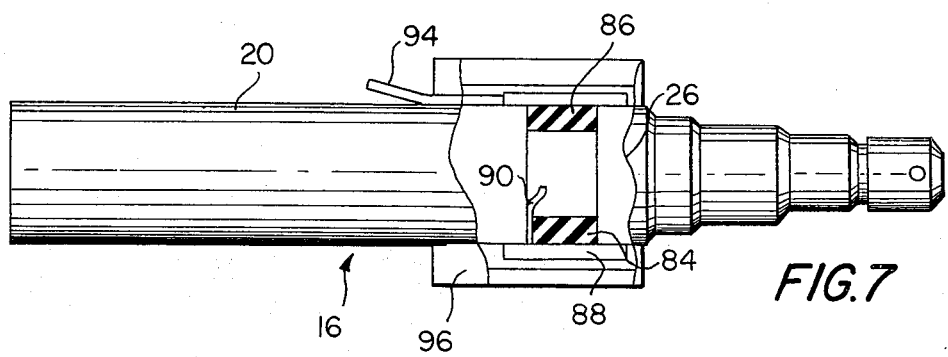
FIG. 7 is a partially cutaway view in side elevation of a stub axle for the vehicle of FIG. 1.

FIG. 7 discloses a completed stub axle 16 for the vehicle 10, and it must be recognized that an identical structure is employed to seal the gauging system for the hitch 18. As illustrated by FIG. 7, the ends of the gauging hole 26 are closed by resilient sealing caps 84 and 86 which are inserted in the ends of the hole. These caps may be formed of rubber or other resilient, waterproof material and should be of sufficient size to seal the ends of the hole 26.

A flexible printed circuit board 88 is wrapped around the body 20 of the axle 16 so as to cover the sealing caps 84 and 86. This printed circuit board carries components of the measuring circuit, such as the resistors 74, 76, and 78, the bridge output resistors, and various span resistors and other components conventionally used in the bridge circuit of an electronic weighing system. These components are formed upon a flexible backing which is wrapped into tight contact with the surface of the stub axle body over the end caps. The components on the printed circuit board are connected to the electrical resistance strain gauges in the hole 26 by means of a connector 90 which is sealed against the surface of the hole by the sealing end cap 84. An electrical output signal from the printed circuit board 88 is carried by a cable 92 which is sealed against the surface of the axle body by a suitable potting compound 94. This potting compound is formed around the printed circuit board 88 to seal the board against moisture, dirt, and other elements present in the environment to which the axle 16 will be subjected. The potting compound may be provided by any known plastic or other sealing compound conventionally used to seal electrical circuits.

Finally, a resilient sealing boot 96 is placed over the potting layer 94 and the cable 92 to enclose and protect the potted printed circuit board. This boot may be formed of hard rubber, fiberglass reinforced plastic, or other material adapted to resist shock and provide protection against the environment to which the axle 16 is subjected. A similar boot and sealing structure is employed on the hitch 18. The boot, potting compound, printed circuit board and end plugs are formed from materials having sufficient flexibility so that these components do not interfere with the bending stress imposed by a load on the stub axles and hitch.

We claim:

1. A load transducer assembly for a wheeled vehicle including a load support comprising elongate elastic cantilevered beam means adapted to receive a force from said load support in a direction substantially normal to the longitudinal axis of said beam means, said beam means having a hole extending therethrough in a direction normal to the central longitudinal axis of said beam means and normal to the direction of said force applied thereto, and strain gauge means including at least two electrical resistance strain gauges mounted on said beam means within said hole for sensing the magnitude of force applied to said beam means, said strain gauge means being angularly positioned relative to a vertical plane through the central axis of said hole which is perpendicular to the longitudinal axis of said beam means to minimize the moment sensitivity of said strain gauge means, one of said electrical resistance strain gauges being spaced from said vertical plane on either side thereof.

2. The load transducer assembly of claim 1 wherein said hole is formed in the half of said beam means remote from the point where said force is applied to said beam means.

3. The load transducer assembly of claim 1 wherein said beam means is of substantially uniform cross-section from the point where said force is applied thereto to at least a point between said hole and the end of said beam means beyond said hole and remote from said force application point.

4. The load transducer assembly of claim 1 wherein said strain gauge means includes electrical strain gauges equally spaced on either side of said vertical plane and positioned so that a line from the center of each such strain gauge to the central axis of said hole forms an angle with said vertical plane within the range of 37° to 47°.

5. The load transducer assembly of claim 1 wherein said strain gauge means includes electrical strain gauges equally spaced on either side of said vertical plane and positioned so that a line from the center of each such strain gauge to the central axis of said hole forms an angle of 42° with said vertical plane.

6. The load transducer assembly of claim 1 wherein closure means are provided to seal said hole and protect said strain gauges, said closure means being formed of flexible material so as not to substantially alter the effects of force applied to said beam means.

7. The load transducer assembly of claim 6 wherein said closure means include end plugs to close either end of said hole and a boot surrounding said beam means to enclose said end plugs.

8. The load transducer assembly of claim 7 wherein said strain gauge means includes electrical circuit means formed on a flexible circuit board, the electrical resistance strain gauges being connected to said electrical circuit means, said flexible circuit board being engaged with and surrounding said beam means over said end plugs, said boot enclosing said flexible circuit board.

9. The load transducer assembly of claim 8 wherein said closure means includes a flexible potting material encasing said flexible circuit board and extending between said flexible circuit board and said boot, said potting material operating to seal said flexible circuit board from elements in the ambient environment.

10. The load transducer assembly of claim 1 wherein said elastic cantilevered beam means includes at least a first axle for said wheeled vehicle and a hitch, both said first axle and hitch forming elastic cantilever beams having a first end thereof rigidly secured to said load support, a second end of said first axle being formed to mount a ground engaging wheel for said vehicle and a second end of said hitch being adapted for connection with a towing vehicle, the electrical resistance strain gauges forming the strain gauge means for said first axle and hitch being electrically connected in a measuring bridge configuration.

11. The load transducer assembly of claim 10 wherein the strain gauge means for said hitch includes at least two active electrical resistance strain gauges mounted on said hitch within said hole for sensing the magnitude of force applied to said hitch, said active strain gauges being spaced from said vertical plane on either side thereof and angularly positioned relative to said vertical plane to minimize the moment sensitivity of said active strain gauges and two inactive electrical resistance strain gauges mounted within said hole on the neutral axis of said hitch and oriented cross-wise to the direction of force applied to said hitch so as to be non responsive to strain.

12. The load transducer assembly of claim 11 wherein said elastic cantilevered beam means includes a second axle for said wheeled vehicle forming a cantilevered beam having a first end thereof rigidly secured to said load support and a second end formed to mount a ground engaging wheel for said vehicle, the electrical resistance strain gauges forming the strain gauge means for said first and second axles being connected to form a first measuring bridge and the active and passive strain gauges of said hitch being connected to form a second measuring bridge, said first and second measuring bridges being connected in parallel between input and output terminals of a measuring bridge circuit.

13. The load transducer assembly of claim 12 wherein said hole is formed in the first and second axles and the hitch in the half section thereof between the center and said second end.

14. The load transducer assembly of claim 12 wherein said first and second axles and said hitch are of substantially uniform cross-section from the first ends thereof to at least a point between said hole and the second ends thereof.

15. The load transducer assembly of claim 14 wherein the strain gauge means for each of said first and second axles includes at least two electrical resistance strain gauges mounted within the hole formed in each said axle for sensing the magnitude of force applied to each said axle, the electrical resistance strain gauges in each axle being spaced on either side of the vertical plane through the central axis of said hole which is perpendicular to the longitudinal axis of said axles, the active electrical resistance strain gauges in said hitch and the electrical resistance strain gauges to said vertical plane so that a line from the center of each such electrical resistance strain gauge to the central axis of said hole forms an angle with said vertical plane within the range of from 37° to 47°.

16. The load transducer assembly of claim 2 wherein said beam means is of substantially uniform cross-section from the point where said force is applied thereto to at least a point between said hole and the outer end of said beam means beyond said hole and remote from said force application point.

17. The load transducer assembly of claim 16 wherein said beam means is formed by an axle for said vehicle, said axle constituting an elongated elastic cantilevered beam having a first end for receiving a force from said load support and an outer end of reduced cross-section formed to receive a ground engaging wheel, said hole being formed proximate to but spaced from the reduced cross sectional portion of said axle.

18. The load transducer assembly of claim 17 wherein the diameter of said hole is no greater than the radius of said axle in the section thereof through which said hole is formed.

19. The load transducer assembly of claim 18 wherein said strain gauge means includes electrical resistance strain gauges equally spaced on either side of said vertical plane and positioned so that a line from the center of each such strain gauge to the central axis of said hole forms an angle with said vertical plane with the range of from 37° to 47°.

20. The load transducer assembly of claim 19 wherein closure means are provided to seal said hole and protect the strain gauges, said closure means being formed of flexible material so as not to substantially alter the effects of force applied to said axle.

21. The load transducer assembly of claim 20 wherein said closure means include end plugs to close either end of said hole and a boot surrounding said beam means to enclose said end plugs, said strain gauge means including electrical circuit means formed on a flexible circuit board, the electrical resistance strain gauges being connected to said electrical circuit means, said flexible circuit board being engaged with and surrounding said axle over said end plugs and said boot enclosing said flexible circuit board.

22. The load transducer assembly of claim 21 wherein said closure means includes a flexible potting material encasing said flexible circuit board and extending between said flexible circuit board and said boot, said potting material operating to seal said flexible circuit board from elements in the ambient environment.

* * * * *